(«12») United States Patent
Freienstein et al.

(10) Patent No.: US 10,752,195 B2
(45) Date of Patent: Aug. 25, 2020

(54) METHOD AND CONTROL UNIT FOR PROVIDING AN ACTIVATION SIGNAL FOR ACTIVATING AT LEAST ONE OCCUPANT PROTECTION DEVICE FOR A VEHICLE, SEAT BELT SENSOR FOR A SEAT BELT OF A VEHICLE, AND SAFETY SYSTEM FOR A VEHICLE

(71) Applicant: Robert Bosch GmbH, Stuttgart (DE)

(72) Inventors: Heiko Freienstein, Weil der Stadt (DE); Sybille Eisele, Hessigheim (DE)

(73) Assignee: Robert Bosch GmbH, Stuttgart (DE)

( * ) Notice: Subject to any disclaimer, the term of this patent is extended or adjusted under 35 U.S.C. 154(b) by 239 days.

(21) Appl. No.: 16/039,591

(22) Filed: Jul. 19, 2018

(65) Prior Publication Data
US 2019/0023209 A1 Jan. 24, 2019

(30) Foreign Application Priority Data
Jul. 20, 2017 (DE) .................. 10 2017 212 527

(51) Int. Cl.
*B60R 21/015* (2006.01)
*B60R 22/26* (2006.01)
*B60R 22/48* (2006.01)
*B60R 21/01* (2006.01)

(52) U.S. Cl.
CPC .... *B60R 21/0153* (2014.10); *B60R 21/01548* (2014.10); *B60R 21/01554* (2014.10); *B60R 22/26* (2013.01); *B60R 22/48* (2013.01); *B60R 2021/01286* (2013.01); *B60R 2022/4858* (2013.01)

(58) Field of Classification Search
CPC .......... B60R 21/0153; B60R 21/01548; B60R 21/01554; B60R 22/26; B60R 22/48; B60R 2021/01286; B60R 2022/4858
See application file for complete search history.

(56) References Cited

U.S. PATENT DOCUMENTS

2018/0339675 A1* 11/2018 Jenny .................. B60R 21/0132

* cited by examiner

*Primary Examiner* — Michael D Lang
(74) *Attorney, Agent, or Firm* — Norton Rose Fulbright US LLP; Gerard Messina

(57) ABSTRACT

A method for providing an activation signal activating a vehicle occupant protection device includes reading in passenger compartment data from a passenger compartment detection unit and seat belt data from a seat belt sensor. The passenger compartment data represent a passenger compartment of the vehicle. The seat belt data represent a seat belt fastening angle of a seat belt of the vehicle at a belt reversing point relative to a reference axis of the vehicle. The method also includes determining, based on the passenger compartment data, a piece of seat position information representing an occupancy state of a vehicle seat by an occupant and a relative position of the seat relative to the vehicle; ascertaining an occupant class, representing a physical characteristic of the occupant, using the seat position information seat belt data; and generating the activation signal using the seat position information and the occupant class.

12 Claims, 4 Drawing Sheets

METHOD AND CONTROL UNIT FOR PROVIDING AN ACTIVATION SIGNAL FOR ACTIVATING AT LEAST ONE OCCUPANT PROTECTION DEVICE FOR A VEHICLE, SEAT BELT SENSOR FOR A SEAT BELT OF A VEHICLE, AND SAFETY SYSTEM FOR A VEHICLE

CROSS-REFERENCE TO RELATED APPLICATIONS

The present application claims priority under 35 U.S.C. § 119 to DE 10 2017 212 527.6, filed in the Federal Republic of Germany on Jul. 20, 2017, the content of which is hereby incorporated by reference herein in its entirety.

FIELD OF THE INVENTION

The present invention relates to a device, method, and system for control of a vehicle occupant protection device.

BACKGROUND

In connection with an activation of occupant protection devices of vehicles, for example seat position switches can be used, for example to detect a foremost seat position on the passenger side or the like. When such a seat position is detected, this piece of information can be included, for example, to draw a conclusion that a certain type of person, for example a small person, is sitting on the front passenger seat. An adaptation of a restraint system of the vehicle can then take place.

SUMMARY

According to specific embodiments, in particular an occupant classification and adaptation of a restraint system or safety system of a vehicle can be achieved in that a piece of information about occupants is supplied as a function of their seat position. For example, sensor data mapping a passenger compartment and a seat belt fastening angle can be used. In this way, it is possible to draw a precise conclusion about the properties of the vehicle occupant using a combination of sensor data with respect to the passenger compartment of a vehicle and seat belt data with respect to the seat belt fastening angle of a seat belt fastened by a vehicle occupant.

Advantageously, according to example embodiments, in particular the occupant classification and adaptation or activation of the safety system can be achieved with minimal complexity, it being possible, for example, to use only existing and, additionally or alternatively, insignificantly modified sensor systems. An activation or adaptation of the restraint system or safety system to real conditions which is particularly precise, appropriate for the situation and reliable can be achieved.

According to an example embodiment of the present invention, a method provides an activation signal for activating at least one occupant protection device for a vehicle. The method includes: reading in passenger compartment data from at least one passenger compartment detection unit and seat belt data from at least one seat belt sensor, the passenger compartment data representing a passenger compartment of the vehicle, the seat belt data representing at least one seat belt fastening angle of at least one seat belt of the vehicle at a belt reversing point relative to a reference axis of the vehicle; determining a piece of seat position information using the passenger compartment data, the piece of seat position information representing an occupancy state of at least one vehicle seat by at least one vehicle occupant and a relative position of the at least one vehicle seat relative to the vehicle; ascertaining an occupant class of the at least one vehicle occupant, using at least the piece of seat position information and the seat belt data, the occupant class representing at least one body characteristic of the at least one vehicle occupant; and generating the activation signal, using at least the piece of seat position information and the occupant class.

This method can be implemented in software or hardware or in a mixed form made up of software and hardware, for example in a control unit. An occupant protection device can include an airbag, a seat belt load limiter, etc. A passenger compartment detection unit can include a camera, a radar unit, etc. The belt reversing point can be situated, for example, adjoining a headrest of a vehicle seat, when a seat belt integrated into the seat is involved. If the seat belt guide comes out of the B-pillar, the belt reversing point can be accommodated there. The reference axis can be a vertical axis of the vehicle, for example. The seat belt fastening angle represents an angle between the reference axis and a longitudinal extension axis of at least one subsection of the seat belt between the belt reversing point and a buckle of the seat belt. A vehicle occupant sits in a vehicle seat. The body characteristic can be understood to mean a weight of the vehicle occupant, for example. In addition or as an alternative, the occupant class can, not only be represented by the weight criterion, but also include a combination of multiple criteria, such as weight, upper body length, muscle mass, etc. or represent one of these criteria.

According to an example embodiment, the seat belt data read in the step of reading in can represent a seat belt extension length of the at least one seat belt. In this way, the occupant class can be ascertained even more precisely and reliably, and an even more accurate activation signal which is even more appropriate for the situation can thus be generated.

In the step of determining, it is also possible to determine a piece of seat position information which represents a sitting posture of a vehicle occupant of the at least one vehicle seat relative to the vehicle seat. Such a specific embodiment offers the advantage that the at least one occupant protection device can be activated in a way which is matched even more exactly to the occupant class, it being possible to take different sitting postures into consideration, for example forward leaning sitting posture or the like.

In the step of determining, furthermore a piece of occupant information can be determined. The piece of occupant information can represent at least one dimension and, additionally or alternatively, a clothing status of the at least one vehicle occupant. In the step of ascertaining, the occupant class can be ascertained, using the piece of occupant information. In the step of generating, the activation signal can also be generated, using the piece of occupant information. The clothing status can represent a layer thickness of clothing worn by the vehicle occupants. In this way, the occupant class and the activation signal can be ascertained or generated particularly precisely and reliably, in particular also a plausibility check of the seat belt data based on the piece of occupant information being implementable.

In the step of ascertaining, moreover the occupant class can be ascertained, using operating data of the vehicle. The operating data can represent an operating state of a seat heater, a heater, a fan and, additionally or alternatively, an air conditioning unit of the vehicle. Such a specific embodiment offers the advantage that a plausibility check can be carried out, and the occupant class can be ascertained reliably and taking, for example, weather conditions influencing a clothing status of the vehicle occupant into consideration.

In particular, in the step of ascertaining, the occupant class can be ascertained, using a list or matrix including values for the seat belt fastening angle which are dependent on at least the piece of seat position information. In this way, the occupant class and the activation signal can be ascertained or generated easily, quickly, and without complexity.

According to an example embodiment, the method can include a step of moving the at least one vehicle seat to a predetermined relative position relative to the vehicle. The step of reading in, the step of determining, the step of ascertaining and the step of generating can be carried out after the step of moving. In this way, easily comparable, and thus even more reliable, measuring results can be obtained.

The approach described here furthermore creates a control unit which is designed to carry out, activate, or implement the steps of one variant of a method described here in corresponding units. The object of the present invention can also be achieved quickly and efficiently by this embodiment variant of the present invention in the form of a control unit.

For this purpose, the control unit can include at least one processing unit for processing signals or data, at least one memory unit for storing signals or data, at least one interface to a sensor, or an actuator for reading in sensor signals from the sensor or for outputting control signals to the actuator and/or at least one communication interface for reading in or outputting data which are embedded into a communication protocol. The processing unit can be a signal processor, a microcontroller, etc., for example, it being possible for the memory unit to be a Flash memory, an EEPROM, or a magnetic memory unit. The communication interface can be designed to read in or output data wirelessly and/or in a wire-bound manner, a communication interface which is able to read in or output wire-bound data being able to read these data in, for example electrically or optically, from a corresponding data transmission line or output these into a corresponding data transmission line.

A control unit within the present context can be understood to mean an electrical device which processes sensor signals and outputs control and/or data signals as a function thereof. The control unit can include an interface which can be designed as hardware and/or software. In the case of a hardware design, the interfaces can, for example, be part of a so-called system ASIC which includes a wide variety of functions of the control unit. However, it is also possible for the interfaces to be separate integrated circuits, or to be at least partially made up of discrete elements. In the case of a software design, the interfaces can be software modules which are present on a microcontroller, for example, in addition to other software modules.

In an example embodiment, the control unit carries out a control or activation of at least one occupant protection device of a vehicle. For this purpose, the control unit can access, for example, passenger compartment data and seat belt data in the form of sensor signals, such as image signals and angle sensor signals. The activation takes place via actuators, such as cold gas generators, ignition devices and servo motors.

According to an example embodiment, a seat belt sensor for a seat belt of a vehicle is situated on a belt reversing point adjoining a headrest of the vehicle seat or in the B-pillar, and includes: a contact plate, a circular ring segment having at least two subsections being configured in the contact plate, the contact plate being fixedly situated on the vehicle at the belt reversing point; and a detection unit mechanically connectable or connected to a reverse roller for reversing the seat belt which is pivotable as a function of a seat belt fastening angle of the seat belt and along an extension plane of the contact plate, the detection unit being situatable or situated adjoining the circular ring segment of the contact plate, the detection unit being designed, in a state in which the detection unit is connected to the reverse roller and situated adjoining the circular ring segment of the contact plate, to detect a subsection of the circular ring segment of the contact plate which is dependent on a pivoting of the detection unit relative to the contact plate, in order to provide seat belt data.

The seat belt sensor can be designed to provide seat belt data for use by an example embodiment of the above-described method. Each seat belt of a vehicle can be assigned one specimen of the seat belt sensor.

According to an example embodiment, the detection unit can include at least one mechanical detection element, at least one magnetic detection element and, additionally or alternatively, at least one optical detection element and, additionally or alternatively, an electrical detection element, for example an electrical contact. Depending on the specific application scenario, the seat belt fastening angle can thus be reliably and precisely identified using a suitable detection principle.

According to an example embodiment of the present invention, a safety system for a vehicle includes: a control unit as described; at least one occupant protection device; at least one passenger compartment detection unit; and the above-described seat belt sensor, where the control unit is connectable or connected to the at least one occupant protection device, to the at least one passenger compartment detection unit, and to the at least one seat belt sensor in a manner which is capable of signal transmission.

In an example, the control unit and the seat belt sensor can thus be used in the safety system to enable an advantageous activation of the at least one occupant protection device.

According to an example embodiment, a computer program product or computer program has program code stored on a machine-readable carrier or storage medium such as a semiconductor memory, a hard disk memory, or an optical memory, and which is used to carry out, implement, and/or activate the steps of the method according to one of the example embodiments described above, in particular if the program product or program is executed on a computer or a device.

Exemplary embodiments of the approach presented here are shown in the drawings and are described in greater detail in the following description.

DETAILED DESCRIPTION

Figure 1:
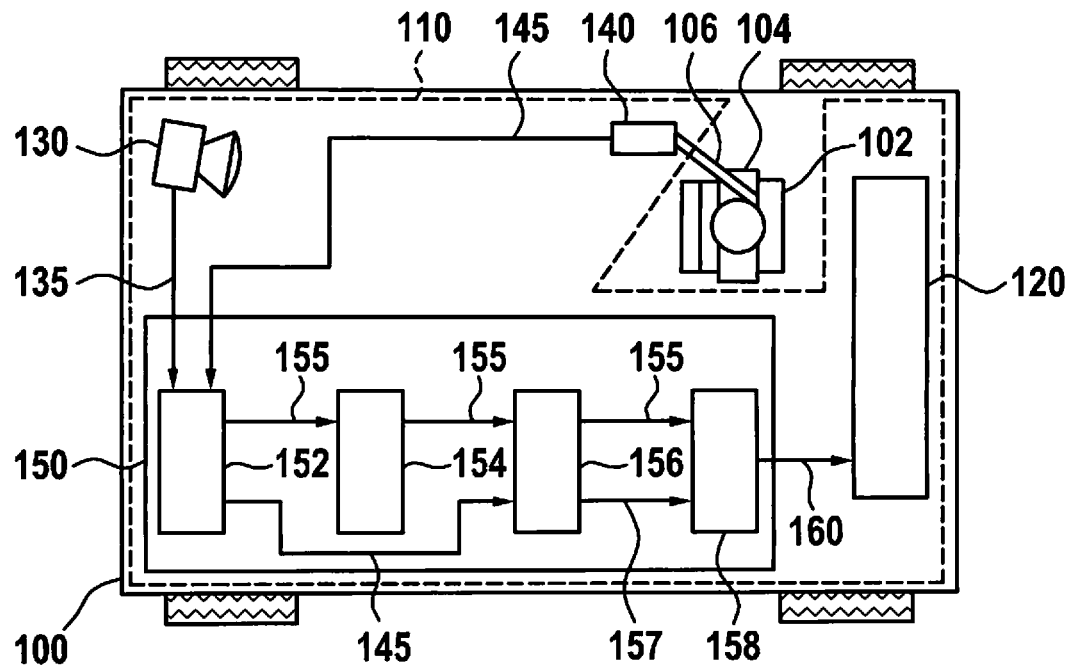
FIG. 1 shows a schematic representation of a vehicle including a safety system according to one exemplary embodiment.

In the following description of favorable exemplary embodiments of the present invention, identical or similar reference numerals are used for similarly acting elements shown in the different figures, and a repeated description of these elements is dispensed with.

FIG. 1 shows a schematic representation of a vehicle 100 including a safety system 110 according to one exemplary embodiment. Vehicle 100 is a passenger car or the like. According to another exemplary embodiment, vehicle 100 can also be a different type of motor vehicle for passenger transportation.

According to the representation in FIG. 1, only one vehicle seat 102 is situated in vehicle 100 by way of example. Vehicle seat 102 is occupied or taken by a vehicle occupant 104. Furthermore, a seat belt 106 is shown, with the aid of which vehicle occupant 104 is buckled to vehicle seat 102.

According to the exemplary embodiment shown in FIG. 1, safety system 110 includes, by way of example, only one occupant protection device 120, by way of example only one passenger compartment detection unit 130, a seat belt sensor 140, and a control unit 150. Occupant protection device 120, passenger compartment detection unit 130 and seat belt sensor 140 are connected to control unit 150 in a manner which is capable of signal transmission. FIG. 1 is a purely schematic representation. Typically, passenger compartment detection unit 130 is situated in front of vehicle occupant 104, and not behind vehicle occupant 104. Passenger compartment detection unit 130 is designed to detect at least the head of vehicle occupant 104, advantageously the head and the upper body of vehicle occupant 104. According to an exemplary embodiment, a distance estimation between vehicle occupant 104 and occupant protection device 120 is carried out from the data detected by passenger compartment detection unit 130.

Occupant protection device 120 is designed, for example, as at least one airbag, a seat belt load limiter and/or the like. Control unit 150 is designed to provide an activation signal 160 for activating occupant protection device 120 or to activate occupant protection device 120 with the aid of an activation signal 160.

According to the exemplary embodiment shown in FIG. 1, passenger compartment detection unit 130 is designed as a camera, for example a stereo camera or a monocamera. According to an exemplary embodiment, passenger compartment detection unit 130 is designed as a camera including active illumination, for example infrared, which also functions at night. According to a further exemplary embodiment, passenger compartment detection unit 130 is also designed as a so-called time of flight (ToF) camera or as a radar sensor, for example. Passenger compartment detection unit 130 is designed to detect a passenger compartment of vehicle 100. Furthermore, passenger compartment detection unit 130 is designed to provide passenger compartment data 135, which represent the passenger compartment of vehicle 100. In particular, passenger compartment data 135 also represent vehicle seat 102 and vehicle occupant 106.

Seat belt sensor 140 is assigned to seat belt 106. Seat belt sensor 140 is designed to detect at least one seat belt fastening angle of seat belt 106 at a belt reversing point relative to a reference axis of vehicle 100. Seat belt sensor 140 is designed to provide seat belt data 145, which represent the seat belt fastening angle.

Control unit 150 includes a read-in unit 152, a determination unit 154, an ascertainment unit 156 and a generation unit 158. Control unit 150 is configured to provide activation signal 160, using passenger compartment data 135 and seat belt data 145.

Read-in unit 152 is designed to read in passenger compartment data 135 from passenger compartment detection unit 130 and seat belt data 145 from seat belt sensor 140. Furthermore, read-in unit 152 is designed to forward passenger compartment data 135 to determination unit 154, and to forward seat belt data 145 to ascertainment unit 156, or to enable their transfer.

Determination unit 154 is designed to receive at least passenger compartment data 135 from read-in unit 152. Furthermore, determination unit 154 is designed to determine a piece of seat position information 155, using passenger compartment data 135. The piece of seat position information 155 represents an occupancy state of vehicle seat 102 and a relative position of vehicle seat 102 relative to vehicle 100. Determination unit 154 is also designed to forward the piece of seat position information 155 to ascertainment unit 156.

Ascertainment unit 156 is designed to receive seat belt data 145 from read-in unit 152, and to receive the piece of seat position information 155 from determination unit 154. Ascertainment unit 156 is also designed to ascertain an occupant class 157 of vehicle occupant 104, using at least the piece of seat position information 155 and seat belt data 145. Occupant class 157 represents at least one body characteristic, for example a weight, an upper body length, a muscle mass, or a combination of such features of vehicle occupant 104. Furthermore, ascertainment unit 156 is designed to forward the piece of seat position information 155 and occupant class 157 to generation unit 158.

Generation unit 158 is designed to receive the piece of seat position information 155 and occupant class 157. Generation unit 158 is also designed to generate activation signal 160, using at least the piece of seat position information 155 and occupant class 157. Generation unit 158, or optionally control unit 150, is moreover designed to provide activation signal 160 for output to occupant protection device 120, or to output it to occupant protection device 120.

According to an exemplary embodiment, determination unit 154 is designed to determine a piece of seat position information 155 which represents a sitting posture of vehicle occupant 104 of vehicle seat 102 relative to vehicle seat 102. According to an exemplary embodiment, determination unit 154 can also be designed to determine a piece of occupant information which represents at least one dimension and/or a clothing status of vehicle occupant 104. This piece of occupant information can be used by ascertainment unit 156 for ascertaining occupant class 157 and by generation unit 158 for generating the activation signal. According to an exemplary embodiment, ascertainment unit 156 is designed to ascertain occupant class 157, using a list or matrix including values for the seat belt fastening angle that are dependent on at least the piece of seat position information 155.

In addition or as an alternative, according to an exemplary embodiment, seat belt data 145 read in with the aid of read-in unit 152 and/or by seat belt sensor 140 represent a seat belt extension length of seat belt 106.

Figure 2:
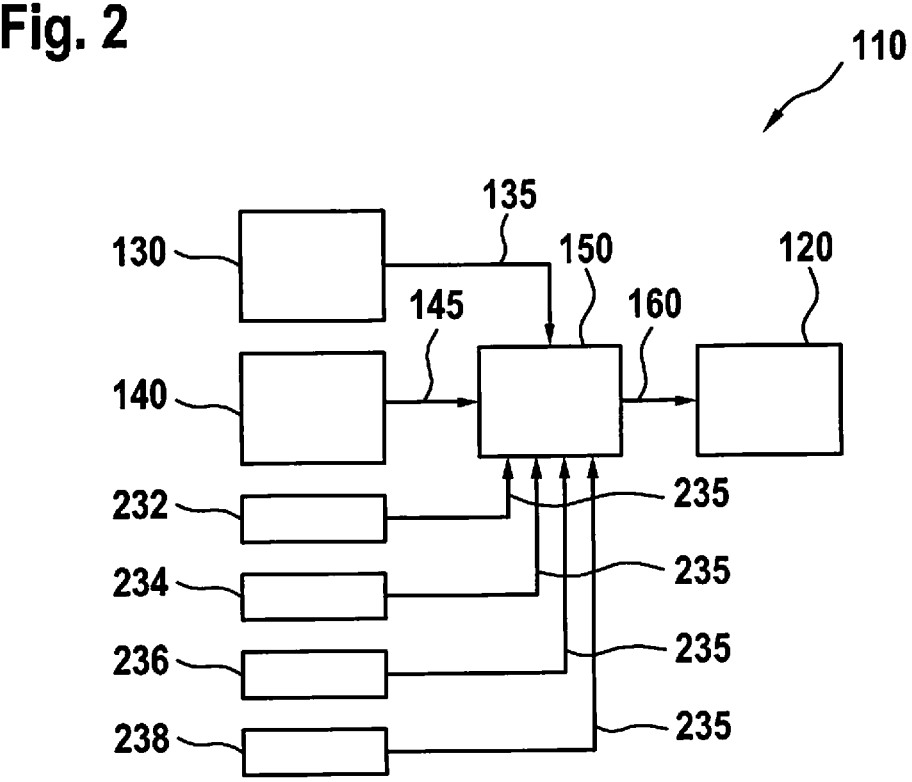
FIG. 2 shows a schematic representation of a safety system according to one exemplary embodiment.

FIG. 2 shows a schematic representation of a safety system 110 according to an exemplary embodiment. Safety system 110 corresponds to the safety system from FIG. 1, with the exception that in safety system 110 in FIG. 2 control unit 150 is additionally, only by way of example, connected to a heater 232, a seat heater 234, a fan 236, and an air conditioning system 238 or air conditioning unit 238 in a manner which is capable of signal transmission.

The ascertainment unit of control unit 150 is designed to ascertain the occupant class, using operating data 235 of the vehicle. Operating data 235 represent an operating state of heater 232, of seat heater 234, of fan 236, and/or of air conditioning system 238. The read-in unit of control unit 150 is designed to read in operating data 235 of heater 232, of seat heater 234, of fan 236 and/or of air conditioning system 238.

According to the exemplary embodiment shown in FIG. 2, passenger compartment detection unit 130 is designed as a sensor system for measuring the distance of the vehicle seat and the vehicle occupant, and for measuring the size of the vehicle occupant. Passenger compartment data 135 can be forwarded, which represent a seat position, a size estimation of the vehicle occupant, optionally a simple classification of clothing (thick or thin clothing) of the vehicle occupant and/or the like, or enable a determination thereof. According to the exemplary embodiment shown in FIG. 2, seat belt sensor 140 is designed to supply a piece of angular information, for example with the aid of a mechanical element on a so-called D-ring or a reverse roller of the seat belt, and/or is implemented as a seat belt extension length measuring system. Seat belt data 145 thus represent a piece of angular information and/or a seat belt extension length. Control unit 150 is designed as an airbag control unit, for example. Activation signal 160 is suitable for effectuating an adapted force level of a seat belt load limiter, an adapted airbag stiffness and/or the like. Occupant protection device 120 includes a seat belt load limiter, a so-called active airbag vent, an adaptive airbag and/or the like as an actuator. Heater 232, seat heater 234, fan 236, and air conditioning system 238, and/or operating data 235, in particular enable a plausibility check of passenger compartment data 135 with respect to winter clothing or the like for a simple classification.

Figure 3:
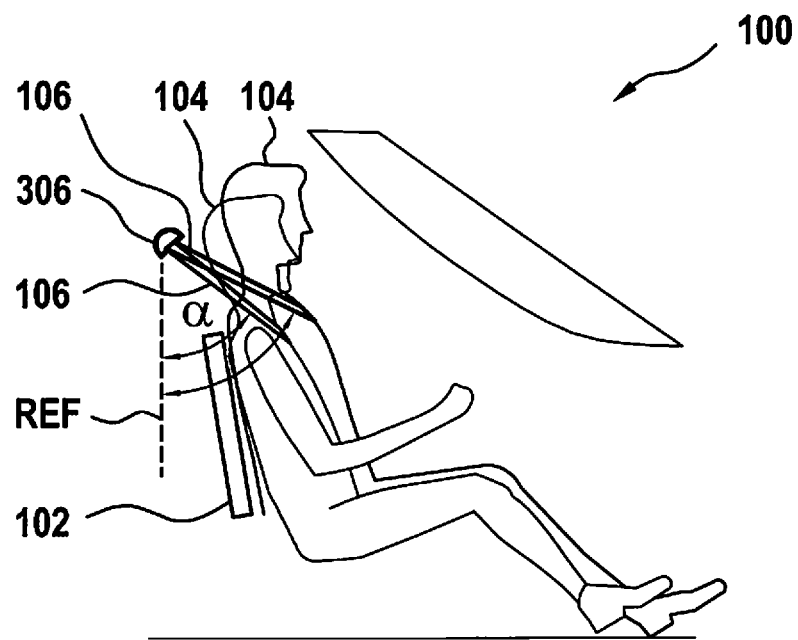
FIG. 3 shows a schematic representation of a subsection of a vehicle according to one exemplary embodiment.

FIG. 3 shows a schematic representation of a subsection of a vehicle 100 according to an exemplary embodiment. Vehicle 100 is the vehicle from FIG. 1 or a similar vehicle. The illustration of FIG. 3 shows vehicle seat 102, two variants or classes of a vehicle occupant 104 and seat belt 106 of vehicle 100 and furthermore a reference axis REF, two values of a seat belt fastening angle $\alpha$, and a reverse roller 306 of seat belt 106. Reverse roller 306 is situated at a belt reversing point. Reference axis REF is a vertical axis of vehicle 100.

When vehicle seat 102 is taken by a first variant or class of vehicle occupant 104, the first variant or class of vehicle occupant 104 representing a large and/or heavy vehicle occupant 104, a seat belt fastening angle $\alpha$ having a first value is spanned between seat belt 106 and reference axis REF in the area of reverse roller 306. When vehicle seat 102 is taken by a second variant or class of vehicle occupant 104, the second variant or class of vehicle occupant 104 representing a small and/or lightweight vehicle occupant 104, or a smaller and/or lighter-weight vehicle occupant than in the first variant, a seat belt fastening angle $\alpha$ having a second value is spanned between seat belt 106 and reference axis REF in the area of reverse roller 306, the second value being smaller than the first value.

Figure 4:
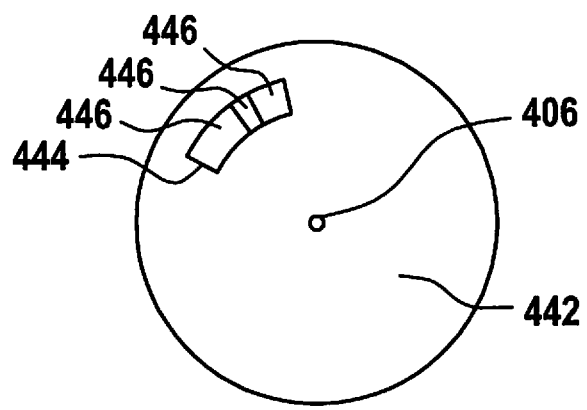
FIG. 4 shows a schematic representation of a subsection of a seat belt sensor according to one exemplary embodiment.

FIG. 4 shows a schematic representation of a subsection of a seat belt sensor according to an exemplary embodiment. Seat belt sensor is provided for a seat belt of a vehicle. The seat belt sensor corresponds or is similar to the seat belt sensor from FIG. 1 and FIG. 2. The seat belt sensor is situated at a belt reversing point 406 adjoining a headrest of the vehicle seat of the vehicle, or at an anchoring point 406 of a reverse roller, such as the reverse roller from FIG. 3, for example.

FIG. 4 shows a contact plate 442 of the seat belt sensor including a circular ring segment 444 having a multitude of subsections 446. According to the exemplary embodiment shown in FIG. 4, contact plate 442 is configured as a circular plate or disk. A center of contact plate 442 is situated in the area of belt reversing point 406. Contact plate 442 is fixedly situated on the vehicle, for example on a body section of the vehicle.

In other words, circular ring segment 444 is configured in contact plate 442. Circular ring segment 444 is divided into the multitude of subsections 446 or includes the multitude of subsections 446. Subsections 446 are situated in a row in circular ring segment 444 in the circumferential direction of contact plate 442.

Figure 5:
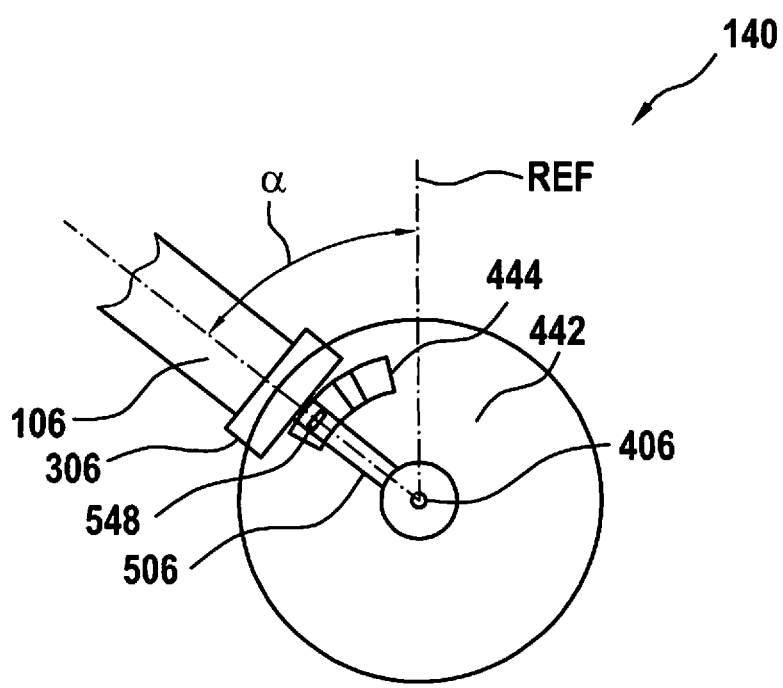
FIG. 5 shows a schematic representation of a seat belt sensor according to one exemplary embodiment.

FIG. 5 shows a schematic representation of a seat belt sensor 140 according to an exemplary embodiment. Seat belt sensor 140 corresponds or is similar to the seat belt sensor from FIG. 1 and FIG. 2. Furthermore, the representation in FIG. 5 corresponds to the representation from FIG. 4, with the exception that more elements of seat belt sensor 140 are shown in FIG. 5. In addition to contact plate 442 including circular ring segment 444, the representation of FIG. 5 shows an anchoring element 506 for anchoring a reverse roller 306 reversing seat belt 106 at belt reversing point 406, and additionally a detection unit 548 of seat belt sensor 140 is shown. Reverse roller 306 is the reverse roller from FIG. 3, for example, or a similar reverse roller.

Detection unit 548 is mechanically connected to a reverse roller 306 for reversing seat belt 106 which is dependent on a seat belt fastening angle $\alpha$ of seat belt 106 and pivotable along an extension plane of contact plate 442. Seat belt fastening angle $\alpha$ is spanned between a longitudinal extension axis of seat belt 106 and reference axis REF. Detection unit 548 is mechanically connected to reverse roller 306 with the aid of anchoring element 506. More precisely, detection unit 548 is attached to or situated on anchoring element 506. In a mounted state of seat belt sensor 140, the mounted state being illustrated in FIG. 5, detection unit 548 is situated adjoining circular ring segment 444 of contact plate 442. In the mounted state of seat belt sensor 140, detection unit 548 is connected to the reverse roller and situated adjacent to circular ring segment 444 of contact plate 442.

Detection unit 548 includes at least one mechanical detection element, at least one magnetic detection element, and/or at least one optical detection element. In addition or as an alternative, detection unit 548 includes at least one electrical detection element. For this purpose, according to an exemplary embodiment, the individual circular segments are encoded with different electrical resistances. Detection unit 548 is designed to detect a subsection 446 of circular ring segment 444 of contact plate 442 which is dependent on a pivoting of detection unit 548 relative to contact plate 442, and thus on seat belt fastening angle $\alpha$, to provide seat belt data. Detection unit 548 is designed to distinguish subsections 446 of circular ring segment 444 of contact plate 442 from one another. At different seat belt fastening angles α, detection unit 548 is situated adjoining different subsections 446 of circular ring segment 444 of contact plate 442.

Figure 6:
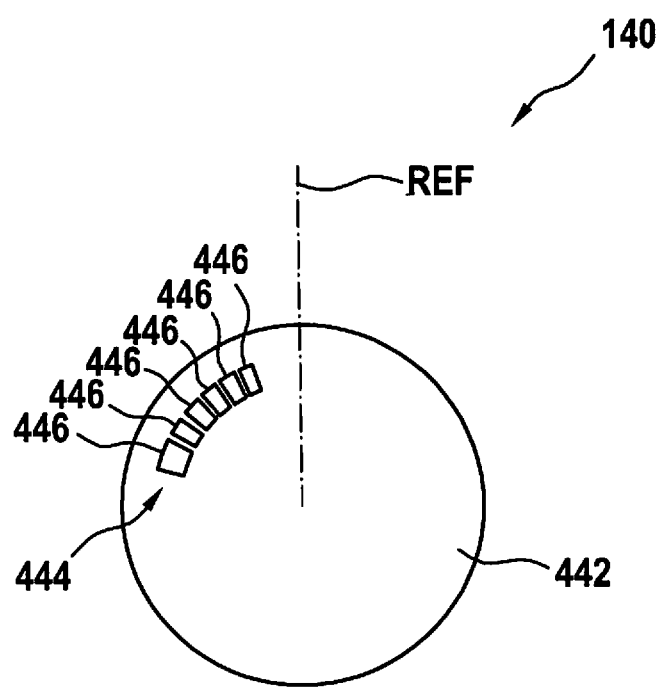
FIG. 6 shows a schematic representation of a subsection of a seat belt sensor according to one exemplary embodiment.

FIG. 6 shows a schematic representation of a subsection of a seat belt sensor 140 according to an exemplary embodiment. The representation in FIG. 6 corresponds to the representation from FIG. 4, with the exception that in FIG. 6, circular ring segment 444 of contact plate 442 includes a larger multitude of subsections 446, only by way of example six subsections 446, and reference axis REF is shown instead of the belt reversing point.

Hereafter, seat belt sensor 140 is described referencing FIGS. 4 through 6. Seat belt sensor 140 represents, in particular, a mechanical element for detecting seat belt fastening angle α between the seat belt anchoring or the strap of seat belt 106 and a predefined reference axis REF. Circular ring segment 444 or the circular segment is divided into subsections 446 here for identification of seat belt fastening angle α. According to an exemplary embodiment, a dimension or an arc length of subsections 446 is selected in such a way that, around a center seat position of the seat length adjustment, a contact of detection unit 548 with a first subsection 446 corresponds to the seat position of a slender, petite person, and a contact of detection unit 548 with the other subsection 446 corresponds to a person different from a slender, petite person, in particular an average person. According to a further exemplary embodiment, and as is shown in FIG. 6, for example, circular ring segment 444 can be divided into multiple subsections 446 so that a classification can be further refined. A contact of detection unit 548 with different subsections 446 thus results in a piece of quantified angular information. As an alternative, this piece of angular information can also be continuously implemented using a potentiometer. As an alternative, it is also possible to use a Hall sensor as detection unit 548 for the angular measurement.

Figure 7:
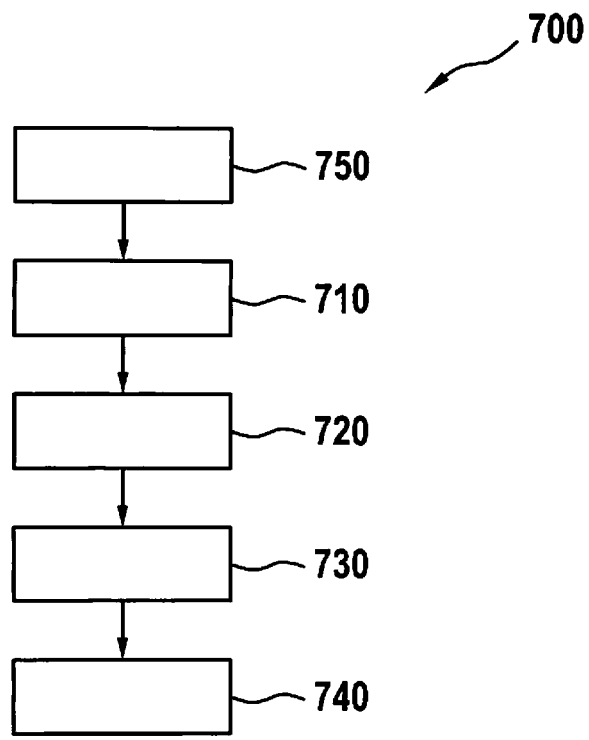
FIG. 7 shows a flow chart of a method for providing according to one exemplary embodiment.

FIG. 7 is a flowchart that illustrates a method 700 according to an exemplary embodiment. Method 700 is executable to provide an activation signal for activating at least one occupant protection device for a vehicle. Method 700 is executable in conjunction with a safety system, which corresponds or is similar to the safety system from one of the above-described figures, or using a control unit, which corresponds or is similar to the control unit from one of the above-described figures.

In a step 710 of reading in, initially passenger compartment data from at least one passenger compartment detection unit and seat belt data from at least one seat belt sensor are read in. The passenger compartment data represent a passenger compartment of the vehicle. The seat belt data represent at least one seat belt fastening angle of at least one seat belt of the vehicle at a belt reversing point relative to a reference axis of the vehicle.

Thereafter, a piece of seat position information is determined in a step 720 of determining, using the passenger compartment data. The piece of seat position information represents an occupancy state of at least one vehicle seat and a relative position of the at least one vehicle seat relative to the vehicle. Optionally, the piece of seat position information furthermore represents the relative position of the head and of the upper body relative to the seat back to detect a forward leaning occupant. Furthermore, an occupant class of the at least one vehicle occupant is ascertained in a step 730 of ascertaining, using at least the piece of seat position information and the seat belt data. The occupant class represents at least one body characteristic of the at least one vehicle occupant.

Finally, the activation signal is generated in a step 740 using at least the piece of seat position information and the occupant class.

According to an exemplary embodiment, method 700 also includes a step 750 of moving the at least one vehicle seat to a predetermined relative position relative to the vehicle. Step 750 of moving is carried out prior to step 710 of reading in.

Figure 8:
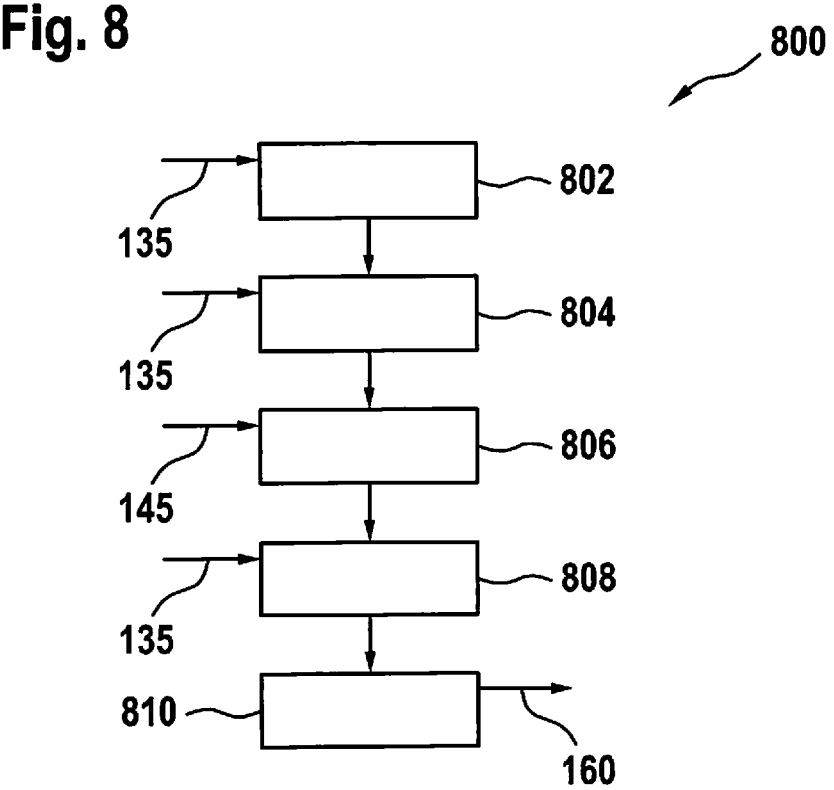
FIG. 8 is a flowchart that illustrates a process for providing an activation signal according to one exemplary embodiment.

FIG. 8 is a flowchart of a process 800 for providing an activation signal 160 according to an exemplary embodiment. Process 800 is executable with the aid of the control unit from FIG. 1 and FIG. 2 and/or the safety system from FIG. 1. In process 800, passenger compartment data 135 are read in, for example by a vehicle camera and/or a distance measuring unit, in a block 802. In block 802, an ascertainment of a seat longitudinal adjustment, a seat position (possibly leaning forward), and/or the like takes place. Thereafter, process 800 transitions to a block 804.

In block 804, passenger compartment data 135 are read in, for example by a vehicle camera and/or the like. In block 804, an ascertainment of a size of a vehicle occupant (upper body length, height of head, etc.) takes place. Then, process 800 transitions to a block 806.

In block 806, seat belt data 145 are read in, which represent pieces of angular information on a reverse roller and/or a seat belt extension length, for example. In block 806, an ascertainment of a classification or occupant class takes place, for example with the aid of a matrix. Thereafter, process 800 transitions to an optional block 808.

In block 808, passenger compartment data 135 are read in for an optional plausibility check and simple classification, for example by a vehicle camera. Then, in block 808, an optional classification takes place, in particular using a plausibility check with respect to thick/thin clothing of the vehicle occupant or the like. Then, process 800 transitions to a block 810.

In block 810, an ascertainment of activation signal 160 for the protective system or restraint system of the vehicle takes place. Activation signal 160 is provided for output, or is output, by block 810.

Exemplary embodiments, background information and advantages of exemplary embodiments are summarized and/or briefly introduced again hereafter in other words with reference to the above-described figures.

An occupant class 157 can imply a rough classification, for example for distinguishing average vehicle occupants 104 from, in particular, slender, lightweight vehicle occupants 104. Such a rough classification can be sufficient for thus selecting, for example, suitable force levels of a switchable seat belt load limiter in the at least one occupant protection device 120 using an appropriately generated activation signal 160 and, where necessary, for adapting the stiffness of an airbag via adaptive vents. For example, it can be possible that a plurality of heavy injured persons are sitting in a middle or rear seat position. This circumstance can even be taken into consideration with reference to an occupant class 157, using safety system 110 or method 700. For example, a lightweight, small vehicle occupant 104 can be identified, and a suitable activation signal 160 can be generated. In particular, higher sternum deflections can be avoided in lightweight persons in that, for example, a force level of a seat belt load limiter is suitably adapted with the aid of activation signal 160.

Usually, vehicle cameras 130 or passenger compartment cameras 130 are installed in vehicles 100, for example to monitor and to warn the driver with respect to drowsiness, to identify whether a seat is occupied, or to identify impermissible seat positions or impermissible handling of objects during automated driving. Vehicle camera 130 supplies passenger compartment data 135 or information about a seat position. Occupant class 157 can be subjected to a plausibility check with the aid of vehicle camera 130.

In addition or as an alternative to vehicle camera 130, a time of flight sensor system can also be used to directly measure a piece of depth information or a distance. Vehicle camera 130 can be implemented as a monocamera or stereo camera. A stereo camera has the advantage that a piece of depth information can be measured directly, in the case of a monocamera the piece of depth information being derivable from the optical flux. In addition or as an alternative to the vehicle camera, it is furthermore also possible to use a radar sensor as passenger compartment detection unit 130, since it is also able to measure distances directly. Passenger compartment detection unit 130 is also designed to supply a piece of information about the size of vehicle occupant 104. It is also possible to subject occupant class 157 to a plausibility check in this way. Persons weighing approximately 50 kilograms are generally not only slender, but also rather small.

According to a further exemplary embodiment, in which vehicle seat 102 can be designed to be electrically adjustable, it is possible initially to move to a middle seat position, in particular after vehicle occupant 104 has entered and buckled seat belt 106. In this position, steps of method 700 are then carried out. Activation signal 160 thus generated and provided is used to adapt the restraint system or safety system 110. The adaptation remains in effect until vehicle occupant 104 exits again. After the ascertainment of the occupant class in the middle seat position, vehicle occupant 104 has the option of individually setting the seat adjustment.

If the vehicle occupants are slender, petite persons, seat belt fastening angle $\alpha$, which is to say the angle between the strap or seat belt 106 and reference axis REF, will be smaller than with less slender persons. In particular, for lightweight, petite persons, for example having a weight of approximately 50 kilograms or the like, a suitable activation or adaptation of the safety system or restraint system, in particular a reduction in a force level of the seat belt load limiter or the like, can be desirable and advantageous. Seat belt fastening angle $\alpha$ is moreover dependent on a seat longitudinal position or relative position of a vehicle seat 102 relative to vehicle 100, and also on the sitting posture or on whether a vehicle occupant 104 is leaning forward, for example. These passenger compartment data 135 are supplied by passenger compartment detection unit 130 or the camera, the time of flight sensor and/or the radar.

A logical matrix, including values for seat belt fastening angle $\alpha$ which are dependent on at least the piece of seat position information 155 for ascertaining occupant class 157, can be created as a function of seat belt fastening angle $\alpha$, the matrix being stored or storable in a memory of control unit 150.

During a calibration of safety system 110, it is possible, for example, to use dummies for a petite, lightweight vehicle occupant 104 and for an average vehicle occupant 104 and/or additionally also persons whose body size and weight correspond or are similar to the values of the described dummies. During the calibration, different seat positions (seat length adjustment) are set. For each seat setting, the associated seat belt fastening angle $\alpha$ or angular range is ascertained with the aid of the dummy or the test person. This results in a matrix of measured values, which can be stored in the memory of control unit 150, preferably an airbag control unit.

A first angular range can be assigned to a front seat position of vehicle seat 102 and a petite, lightweight vehicle occupant 104, a second angular range being assignable to a middle seat position of vehicle seat 102 and petite, lightweight vehicle occupant 104, a third angular range being assignable to a rear seat position of vehicle seat 102 and petite, lightweight vehicle occupant 104, a fourth angular range being assignable to the front seat position of vehicle seat 102 and an average vehicle occupant 104, a fifth angular range being assignable to the middle seat position of vehicle seat 102 and average vehicle occupant 104, and a sixth angular range being assignable to rear seat position of vehicle seat 102 and average vehicle occupant 104.

Calibration parameters with respect to the matrix are different angular ranges. The angular ranges are not sorted by size. The contact between subsections 446 of circular ring segment 444 and detection unit 548 of seat belt sensor 140 is selected in such a way that there is no state in which contact is possible between exactly two subsections 446, but that, when seat belt 106 is properly buckled on, always at least one subsection 446 is contacted by detection unit 548. If two subsections 446 are contacted simultaneously, either vehicle seat 102 is situated in the transition area between a middle seat position and a front or a rear seat position, which, in turn, can be subjected to a plausibility check with the aid of passenger compartment detection unit 130, or vehicle seat 102 is in the middle seat position, and vehicle occupant 104 is a person taller and/or heavier than a petite, lightweight person, but smaller and/or lighter weight than an average person. A separation threshold for a reduced force level of a seat belt load limiter can also be present in this range.

With respect to a consideration of a seat belt extension length, calibration parameters are the different extension lengths, which, by way of example, are referred to as first extension length, second extension length, etc. These are value ranges, e.g., the first extension length represents an interval from a start of the first extension length to an end of the first extension length. These are not sorted by size. Corresponding to the above-described example, a matrix can thus also be created.

In addition or as an alternative, for example, other seat positions, for example front-middle and rear-middle, which are each situated between the foremost and middle, or the middle and rearmost, seat position, can be used. In addition, a further classification or implementation of more occupant classes 157 is possible, for example to enable an increase in the seat belt load level or a stiffer airbag for persons of above-average weight.

If an exemplary embodiment includes an "and/or" linkage between a first feature and a second feature, this should be read in such a way that the exemplary embodiment according to one specific embodiment includes both the first feature and the second feature, and according to an additional specific embodiment includes either only the first feature or only the second feature.

What is claimed is:

1. A method for providing an activation signal for activating at least one occupant protection device of a vehicle, the method comprising:

reading in, from at least one passenger compartment detection unit, passenger compartment data that represents a passenger compartment of the vehicle and, from at least one seat belt sensor, seat belt data that represents at least one seat belt fastening angle of at least one seat belt of the vehicle at a belt reversing point relative to a reference axis of the vehicle;
determining, based on the passenger compartment data, a piece of seat position information that represents an occupancy state of at least one vehicle seat by at least one vehicle occupant and a relative position of the at least one vehicle seat relative to the vehicle;
ascertaining, based at least on the piece of seat position information and the belt data, an occupant class that represents at least one physical characteristic of the at least one vehicle occupant; and
generating the activation signal based on piece of seat position information and the occupant class.

2. The method of claim 1, wherein the read in seat belt data represent a seat belt extension length of the at least one seat belt.

3. The method of claim 1, wherein the piece of seat position information includes information that represents a sitting posture of a vehicle occupant of the at least one vehicle seat relative to the vehicle seat.

4. The method of claim 1, further comprising determining a piece of occupant information that represents at least one of at least one dimension and a clothing status of the at least one vehicle occupant, wherein the ascertainment of the occupant class is further based on the piece of occupant information, and the generation of the activation signal is further based on the piece of occupant information.

5. The method of claim 1, wherein the occupant class is ascertained further based on operating data that represents an operating state of at least one of a heater, a fan and an air conditioning unit of the vehicle.

6. The method of claim 1, wherein the occupant class is ascertained further based on a list or matrix including values for the seat belt fastening angle and which are dependent on at least the piece of seat position information.

7. The method of claim 1, further comprising, prior to the steps of reading in, determining, ascertaining, and generating, moving the at least one vehicle seat to a predetermined relative position relative to the vehicle.

8. A control unit that includes a processor configured to execute a method for providing an activation signal for activating at least one occupant protection device of a vehicle, the method comprising:
reading in, from at least one passenger compartment detection unit, passenger compartment data that represents a passenger compartment of the vehicle and, from at least one seat belt sensor, seat belt data that represents at least one seat belt fastening angle of at least one seat belt of the vehicle at a belt reversing point relative to a reference axis of the vehicle;
determining, based on the passenger compartment data, a piece of seat position information that represents an occupancy state of at least one vehicle seat by at least one vehicle occupant and a relative position of the at least one vehicle seat relative to the vehicle;
ascertaining, based at least on the piece of seat position information and the belt data, an occupant class that represents at least one physical characteristic of the at least one vehicle occupant; and
generating the activation signal based on piece of seat position information and the occupant class.

9. A vehicle seat belt sensor situated at a belt reversing point adjoining a headrest of a vehicle seat or in a B-pillar of a vehicle, the seat belt sensor comprising:
a contact plate that is fixedly situated on the vehicle at the belt reversing point and that includes a circular ring segment with at least two subsections; and
a detection unit that is:
mechanically connectable or connected to a reverse roller for reversing the seat belt dependent on a seat belt fastening angle of the seat belt;
pivotable along an extension plane of the contact plate;
situatable or situated adjoining the circular ring segment of the contact plate; and
when the detection unit is connected to the reverse roller and situated adjoining the circular ring segment of the contact plate, configured to detect, in dependence upon a pivoting of the detection unit relative to the contact plate, a subsection of the circular ring segment of the contact plate, in order to provide seat belt data.

10. The seat belt sensor of claim 9, wherein the detection unit includes at least one of (a) a mechanical detection element, (b) a magnetic detection element, (c) an optical detection element, and (d) an electrical detection element.

11. A safety system for a vehicle, the safety system comprising:
a seat belt sensor that is situated at a belt reversing point adjoining a headrest of a vehicle seat or in a B-pillar of the vehicle and that includes:
a contact plate that is fixedly situated on the vehicle at the belt reversing point and that includes a circular ring segment with at least two subsections; and
a detection unit that is:
mechanically connectable or connected to a reverse roller for reversing the seat belt dependent on a seat belt fastening angle of the seat belt;
pivotable along an extension plane of the contact plate;
situatable or situated adjoining the circular ring segment of the contact plate; and
when the detection unit is connected to the reverse roller and situated adjoining the circular ring segment of the contact plate, configured to detect, in dependence upon a pivoting of the detection unit relative to the contact plate, a subsection of the circular ring segment of the contact plate, in order to provide seat belt data;
an occupant protection device;
a passenger compartment detection unit; and
a control unit that is connectable or connected to, for signal transmission with, the occupant protection device, the passenger compartment detection unit, and the seat belt sensor and that includes a processor configured to execute a method for providing an activation signal for activating the occupant protection device, the method comprising:
reading in, from the passenger compartment detection unit, passenger compartment data that represents a passenger compartment of the vehicle and, from the seat belt sensor, seat belt data that represents at least one seat belt fastening angle of at least one seat belt of the vehicle at a belt reversing point relative to a reference axis of the vehicle;
determining, based on the passenger compartment data, a piece of seat position information that represents an occupancy state of at least one vehicle seat by at least one vehicle occupant and a relative position of the at least one vehicle seat relative to the vehicle;
ascertaining, based at least on the piece of seat position information and the belt data, an occupant class that represents at least one physical characteristic of the at least one vehicle occupant; and generating the activation signal based on piece of seat position information and the occupant class.

12. A non-transitory computer-readable medium on which are stored instructions that are executable by a processor and that, when executed by the processor, causes the processor to perform a method for providing an activation signal for activating at least one occupant protection device of a vehicle, the method comprising:

reading in, from at least one passenger compartment detection unit, passenger compartment data that represents a passenger compartment of the vehicle and, from at least one seat belt sensor, seat belt data that represents at least one seat belt fastening angle of at least one seat belt of the vehicle at a belt reversing point relative to a reference axis of the vehicle;

determining, based on the passenger compartment data, a piece of seat position information that represents an occupancy state of at least one vehicle seat by at least one vehicle occupant and a relative position of the at least one vehicle seat relative to the vehicle;

ascertaining, based at least on the piece of seat position information and the belt data, an occupant class that represents at least one physical characteristic of the at least one vehicle occupant; and generating the activation signal based on piece of seat position information and the occupant class.

* * * * *